United States Patent
Hinkle

(10) Patent No.: US 10,846,190 B2
(45) Date of Patent: Nov. 24, 2020

(54) CONNECTED DEVICE ACTIVATION

(71) Applicant: Lenovo (Singapore) Pte. Ltd., Singapore (SG)

(72) Inventor: Jonathan Randall Hinkle, Raleigh, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 0 days.

(21) Appl. No.: 16/369,515

(22) Filed: Mar. 29, 2019

(65) Prior Publication Data
US 2020/0310935 A1  Oct. 1, 2020

(51) Int. Cl.
| | | |
|---|---|---|
| G06F 11/30 | (2006.01) | |
| G06F 3/0483 | (2013.01) | |
| G06F 3/01 | (2006.01) | |
| G06F 3/0488 | (2013.01) | |
| G06F 3/0482 | (2013.01) | |

(52) U.S. Cl.
CPC .......... *G06F 11/3003* (2013.01); *G06F 3/013* (2013.01); *G06F 3/0482* (2013.01); *G06F 3/0483* (2013.01); *G06F 3/04883* (2013.01)

(58) Field of Classification Search
None
See application file for complete search history.

(56) References Cited

U.S. PATENT DOCUMENTS

| | | | | |
|---|---|---|---|---|
| 2005/0122788 A1* | 6/2005 | Ohashi | ............... | G06F 11/0727 |
| | | | | 365/189.05 |
| 2012/0030566 A1* | 2/2012 | Victor | ................ | G06F 3/04883 |
| | | | | 715/702 |
| 2012/0068850 A1* | 3/2012 | Ito | ........................ | G06F 1/1694 |
| | | | | 340/669 |
| 2016/0004373 A1* | 1/2016 | Huang | ................. | G06F 3/0416 |
| | | | | 345/173 |
| 2016/0328130 A1* | 11/2016 | Patel | ...................... | G06F 3/013 |
| 2017/0269761 A1* | 9/2017 | Chen | ................... | G06F 3/03545 |
| 2018/0052628 A1* | 2/2018 | Endo | ..................... | G06F 3/0634 |
| 2018/0095770 A1* | 4/2018 | Brown | ................. | H04L 9/0891 |
| 2018/0359315 A1* | 12/2018 | Mujibiya | .............. | G06F 1/1684 |

* cited by examiner

*Primary Examiner* — Charles E Anya
(74) *Attorney, Agent, or Firm* — Ference & Associates LLC

(57) ABSTRACT

One embodiment provides a method, including: identifying, using a processor, a connection of a device to an information handling device; receiving, at the information handling device, an indication of a user selection action on the device; and performing, responsive to receiving the indication, an action on the information handling device. Other aspects are described and claimed.

15 Claims, 3 Drawing Sheets

CONNECTED DEVICE ACTIVATION

BACKGROUND

Information handling devices ("devices"), for example laptop and personal computers, tablets, smart phones, other wired or wireless electronic devices, and the like, may comprise one or more ports that other devices can connect to. For example, various data storage devices (e.g., USB flash drives, etc.) may be connected to a user device via attachment of the data storage device to an appropriate port of the user device. Once connected, the data storage device may be used to backup user data, introduce new data to the user device, transmit user data between devices (e.g., by saving user data onto the data storage device from the user device and thereafter attaching the data storage device to another device, etc.), and the like.

BRIEF SUMMARY

In summary, one aspect provides a method, comprising: identifying, using a processor, a connection of a device to an information handling device; receiving, at the information handling device, an indication of a user selection action on the device; and performing, responsive to receiving the indication, an action on the information handling device.

Another aspect provides an information handling device, comprising: a memory device that stores instructions executable by the processor to: identify a connection of a device to the information handling device; receive an indication of a user selection action on the device; and perform, responsive to receiving the indication, an action on the information handling device.

A further aspect provides a product, comprising: a storage device that stores code, the code being executable by a processor and comprising: code that identifies a connection of a device to an information handling device; code that receives an indication of a user selection action on the device; and code that opens, responsive to receiving the indication, one or more windows displaying the data stored on the information handling device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
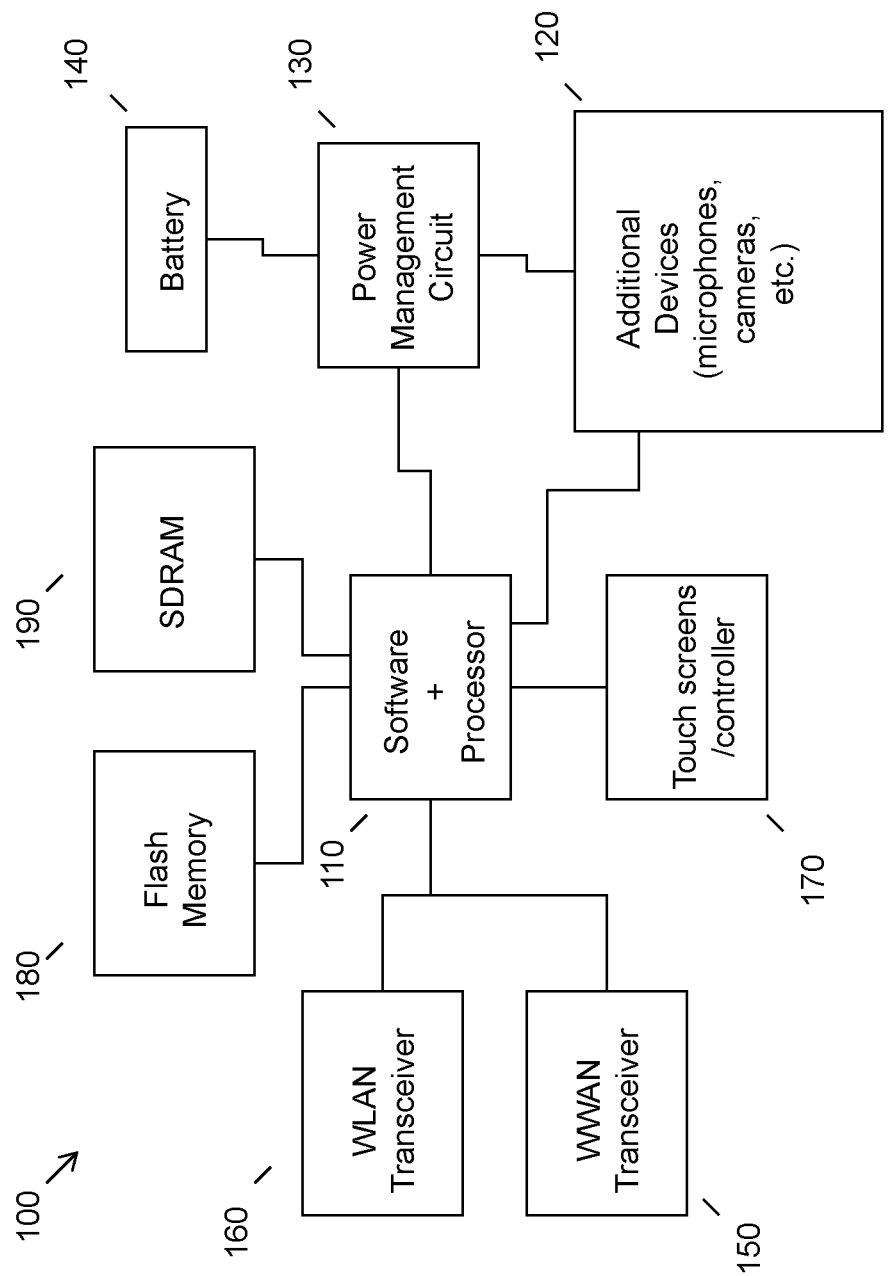
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Users may want to access information stored on certain devices that are capable of establishing a connection with their personal device (e.g., a laptop, etc.). For example, when a data storage device (e.g., a USB device, etc.) is attached to a corresponding port on a user's laptop, the user may be able to access the contents stored on the data storage device. Because many users utilize a windowed graphical user interface (GUI) with many overlapping windows and multi-stage menus, it may require a user many steps to navigate to the data that they would like to access.

To help address this issue, many conventional operating systems have a feature to automatically open a new window that displays the contents of the data storage device when a connection of another device is detected. Once the contents on the data storage device are accessed, a user may interact with, manipulate, and/or add to the contents. However, situations often occur where a user may want to close the one or more windows that display the contents (e.g., because they are finished viewing the contents, to remove screen clutter, etc.). Also, the focus of the GUI often shifts to windows of other applications in windowed environments which then overlap and hide open windows displaying data contents of a storage device. In these situations, the user must resort back to the manual navigation of the GUI to access the contents, which may be time-consuming and burdensome.

Accordingly, an embodiment provides a method for quick and easy access to contents stored on a connected device. In an embodiment, a connection of a device (e.g., data storage device, etc.) to a user's device (e.g., laptop, tablet, smart phone, etc.) may be identified. An embodiment may thereafter receive, at the user device, an indication of a physical, user selection action on the connected device. For example, a user may physically touch or tap on the connected device with their hand. The connected device may contain one or more sensors and/or touch sensitive regions that may be able to detect the physical user contact and thereafter provide an indication of that contact to the user's device. Responsive to receiving the indication, an embodiment may perform one or more actions (e.g., display windows containing the connected device contents, etc.). Such a method provides a simple and intuitive way to access data on a connected device.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, motion sensor such as an accelerometer or gyroscope, etc. System 100 often includes one or more touch screens 170 for data input and display/rendering. System 100 also typically includes various memory devices, for example flash memory 180 and SDRAM 190.

Figure 2:
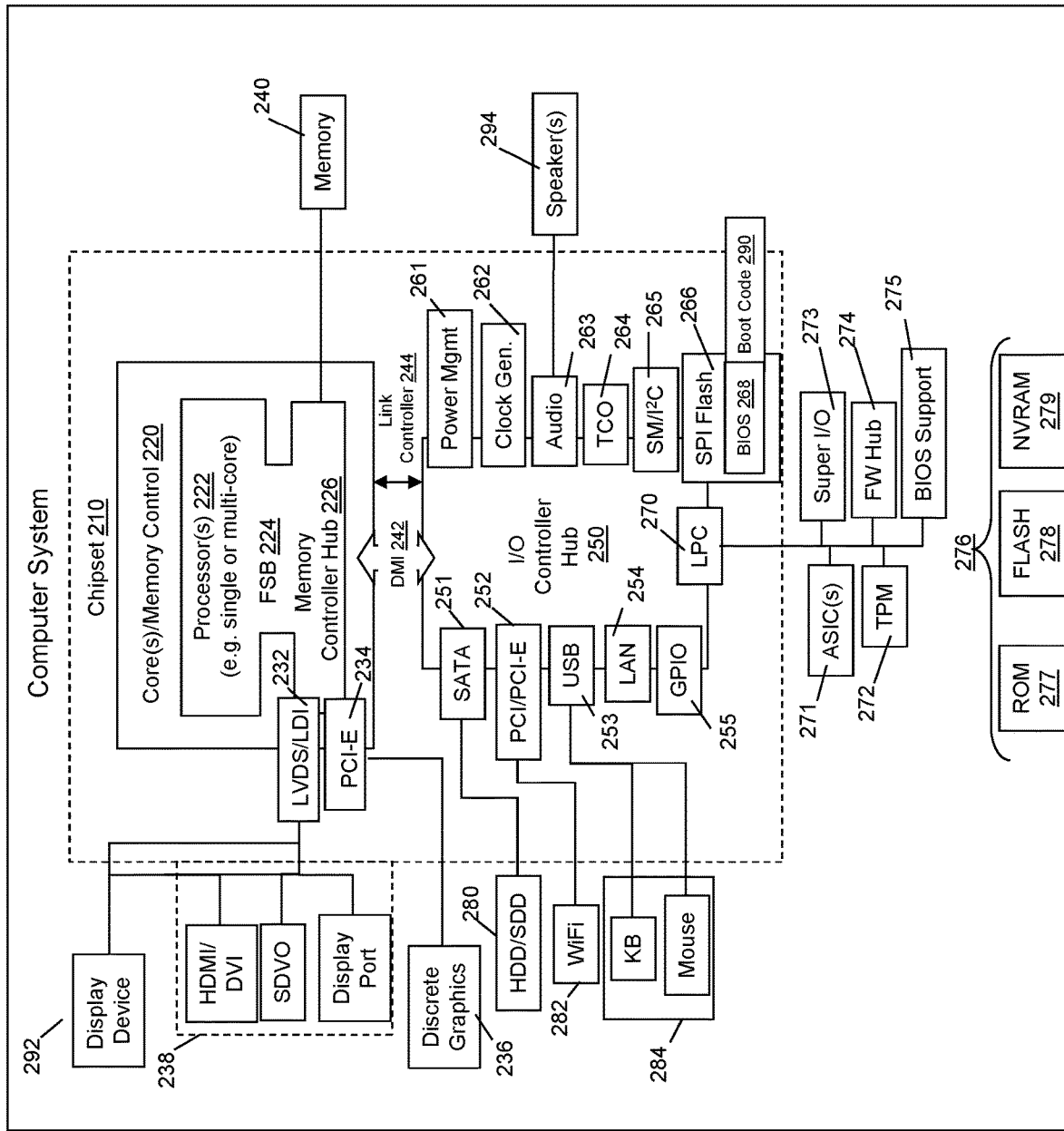
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as laptops, personal computers, smart phones, tablets, and/or other electronic devices that are capable of establishing a connection with other devices (e.g., data storage devices, etc.). For example, the circuitry outlined in FIG. 1 may be implemented in a tablet or smart phone embodiment, whereas the circuitry outlined in FIG. 2 may be implemented in a laptop.

Figure 3:
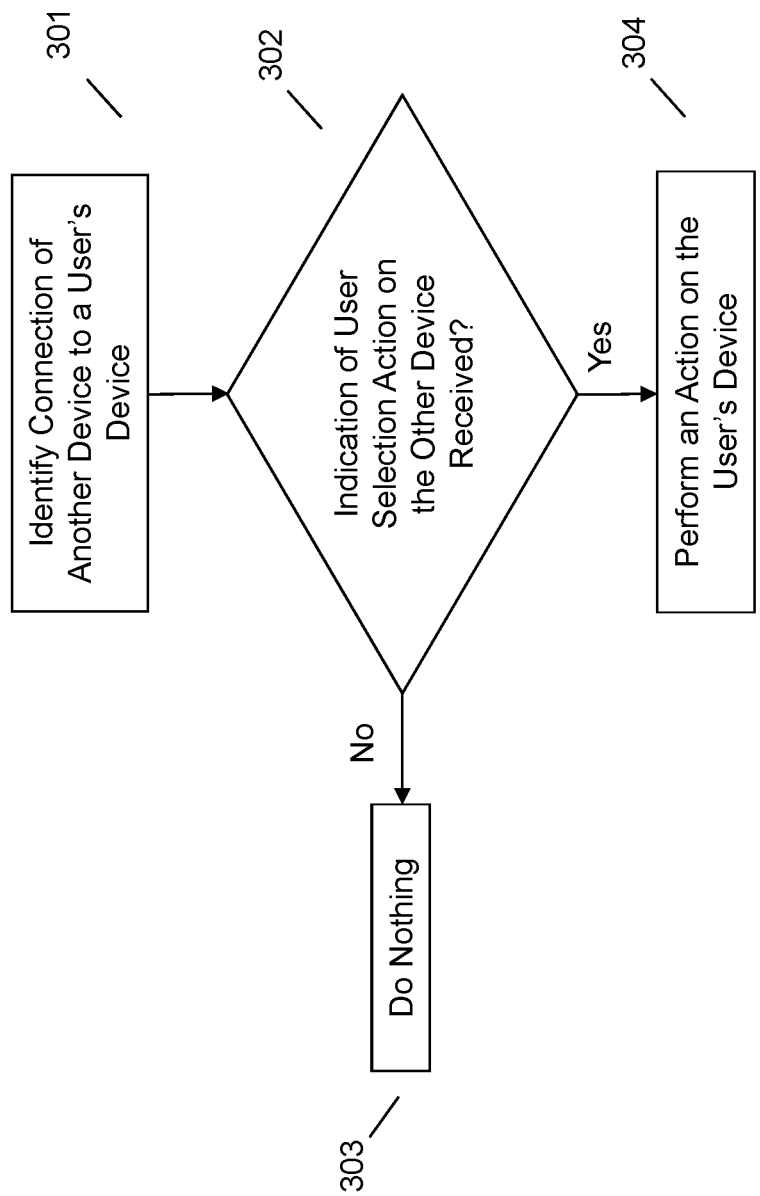
FIG. 3 illustrates an example method of activating content associated with a connectable device.

Referring now to FIG. 3, an embodiment may provide a quick and simple way to access the contents stored on a connected device. At 301, an embodiment may identify a connection between another device and a user's device. In the context of this application, the user's device may be virtually any type of information handling device operable by a user such as a laptop or personal computer, tablet, smart phone, etc. In the context of this application, the other device (hereinafter "connected device") may be virtually any other device that may store contents thereon and is able to establish a connection with the user's device. For example, the connected device may be a data storage device such as a USB flash drive, an external wired or wireless hard drive, etc.

In an embodiment, the connection established between the user's device and the connected device may be a physical connection. In this regard, the connected device may be attached, plugged into, or otherwise physically coupled to the user's device. For example, a USB flash drive may be plugged into a corresponding port on a user's laptop. Alternatively, the connection may be a wireless connection. For example, the connected device may be a wireless, external hard drive that may be capable of establishing a wireless connection with the user's device (e.g., via BLUETOOTH, near-field communication (NFC), another wireless connection technique, etc.). Once a connection is established between the user's device and the connected device, information stored on the connected device can be transmitted to the user device. In an embodiment, a user's device may be able to establish connections with two or more other devices (e.g., two or more physical connections, two or more wireless connections, a combination of the foregoing, etc.).

For simplicity purposes, the majority of the discussion herein will involve a physical connection between a USB data storage device and a user's device. However, such a designation is not limiting and a skilled person will realize that other devices and connection types may also be utilized.

At 302, an embodiment may receive an indication of a user selection action on the connected device. In an embodiment, the user selection action may be associated with a physical interaction with the connected device. For example, the user selection action may correspond to a touching or tapping on some part of the connected device. In an embodiment, the connected device may have a touch sensitive portion on its exterior that may be capable of registering user touch inputs. Additionally or alternatively, the connected device may comprise various other sensors (e.g., pressure sensors, proximity sensors, accelerometers, gyroscopes, other sensors, a combination thereof, and the like) that may be capable of registering a touching action on the connected device. When such a touch selection is detected, the connected device may transmit an indication of the selection to the user's device (e.g., using one or more transmitters/transceivers, via the physical connection between the devices, etc.).

In an embodiment, the touch selection may correspond to a single touch selection. For example, for a touch action to be identified as a touch selection a user need only touch a portion of the connected device once. Alternatively, the touch selection may require a double or multi-touch action in which a user must "double-tap" or more on the connected device. In another embodiment, a touch selection may require that a user touch a portion of a device for a minimum predetermined amount of time (e.g., 1 second, 2 seconds, etc.). Embodiments which require multi-tap touch inputs and/or touch inputs provided for a predetermined time period may help prevent occurrences of accidental touch in which a user inadvertently grazes the connected device with their hand or finger.

In other embodiments, the user selection action may correspond to non-contact interactions with the connected device. For instance, the user selection action may be a hover selection. In this regard, one or more sensors operatively coupled to the connected device may be capable of detecting when a user's hand or finger is hovering over the connected device within a predetermined threshold distance. In an embodiment, the hover selection may require that a user's hand or finger hover over the connected device for a predetermined amount of time to prevent occurrences of accidental selection. In another embodiment, gaze tracking may be utilized to determine whether a user selection action has occurred. For example, one or more cameras (e.g., integrated onto the user's device, the connected device, etc.) may be utilized to identify a focus point of a user's gaze. An embodiment may register a selection action when the focus point of the user's gaze corresponds to a portion of the connected device. Additionally or alternatively, similar to the foregoing, an embodiment may require that the focus point be held on the connected device for a predetermined amount of time before a selection action is identified.

Responsive to not receiving, at 302, an indication of a user selection action, an embodiment may, at 303, take no additional action. Conversely, responsive to receiving, at 302, an indication of a user selection action, an embodiment may, at 304, perform an action on the user's device.

In an embodiment, responsive to receiving the user selection, an embodiment may automatically display the contents of the connected device on a display screen operatively coupled to the user device. For example, responsive to receiving a touch selection on a USB flash drive connected to a laptop, an embodiment may open and display one or more windows comprising the files stored on the connected device. In an embodiment, the windows associated with the connected device may open as a top-level application. Stated differently, the aforementioned windows may open on top of any existing applications presently being displayed on the screen. Alternatively, the windows may be displayed on a portion of the screen that does not overlap an existing application or the size and/or position of windows displayed on the screen may be dynamically adjusted to make room for the aforementioned connected device windows.

In an embodiment, the type of user selection action may correspond to the type of content displayed. For example, if a user performs a single touch action, then a general window showing all of the contents stored on the connected device may be displayed. Alternatively, if the user performs a double-tap action, then a specific file stored on the connected device may be automatically opened. An embodiment may refer to an accessible data store (e.g., stored locally on the user device or on the connected device, remotely at another storage location, etc.) for a listing of associations between user selection types and actions corresponding to each selection type. In an embodiment, the listing of associations may be set by a manufacturer and/or adjusted by a user.

In an embodiment, to close the windows associated with the connected device, a user may perform a user deselection action. In an embodiment, the user deselection action may be the same type of action as the user selection action or may be a different type of action. For example, if a user wanted to close windows housing the contents of the connected device, a user could simply double-tap on the connected device. Alternatively, if a double-tap is required to open the content windows, a deselection action may require a user to provide three consecutive taps to close the content windows.

The various embodiments described herein thus represent a technical improvement to conventional techniques for opening the contents on a connected device. Using the techniques described herein, an embodiment may identify a connection of a device to a user's device. An embodiment may thereafter receive an indication of a user selection action on the connected device and thereafter automatically perform, without additional user input, an action on the user's device (e.g., automatically open and display the contents stored on the connected device, etc.). Such a method may provide a user with seamless, quick, and easy access to the contents stored on a connected device by removing the existing burden of navigating through a plurality of windows and menus on a user's windowed GUI.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method of accessing contents on a device, the method comprising:
   identifying, using a processor, a connection of the device to an information handling device;
   receiving, at the information handling device, an indication of a user selection action on the device, wherein the user selection action corresponds to two consecutive taps on the device;
   performing, responsive to receiving the indication, an action on the information handling device, wherein the performing the action comprises opening, on the information handling device, at least one file stored on the device; and
   performing another action, different than the action, responsive to receiving an indication that another user selection action was detected on the device, wherein the another user selection action corresponds to three consecutive taps on the device and wherein the performing the another action comprises closing, on the information handling device, the at least one file.

2. The method of claim 1, wherein the user selection action corresponds to a touch selection on the device.

3. The method of claim 2, wherein the touch selection comprises touch contact with the device for a minimum predetermined amount of time.

4. The method of claim 1, wherein the user selection action further comprises a gaze selection for a predetermined amount of time.

5. The method of claim 1, wherein a type of the user selection action controls the action performed on the information handling device.

6. The method of claim 1, wherein the performing comprises automatically performing the action without additional user input.

7. The method of claim 1, wherein the opening comprises displaying at least one window listing the at least one file stored on the device.

8. An information handling device for accessing contents on a device, the information handling device comprising:
   a memory device that stores instructions executable by the processor to:
   identify a connection of a device to the information handling device;
   receive an indication of a user selection action on the device, wherein the user selection action corresponds to two consecutive taps on the device;
   perform, responsive to receiving the indication, an action on the information handling device, wherein the performing the action comprises opening, on the information handling device, at least one file stored on the device; and
   perform another action, different than the action, responsive to receiving an indication that another user selection action was detected on the device, wherein the another user selection action corresponds to three consecutive taps on the device and wherein the performing the another action comprises closing, on the information handling device, the at least one file.

9. The information handling device of claim 8, wherein the user selection action corresponds to a touch selection on the device.

10. The information handling device of claim 9, wherein the touch selection comprises touch contact with the device for a minimum predetermined amount of time.

11. The information handling device of claim 8, wherein the user selection action further comprises a gaze selection for a predetermined amount of time.

12. The information handling device of claim 8, wherein a type of the user selection action controls the action performed on the information handling device.

13. The information handling device of claim 8, wherein the instructions executable by the processor to perform comprise instructions executable by the processor to automatically perform the action without additional user input.

14. The information handling device of claim 8, wherein the instructions executable by the processor to open comprise instructions executable by the processor to display at least one window listing the at least one file stored on the device.

15. A product for accessing contents on a device, the product, comprising:

a storage device that stores code, the code being executable by a processor and comprising:

code that identifies a connection of a device to an information handling device;

code that receives an indication of a user selection action on the device, wherein the user selection action corresponds to two consecutive taps on the device;

code that performs, responsive to receiving the indication, an action, wherein the code that performs the action comprises code that opens at least one file stored on the device; and code that performs another action, different than the action, responsive to receiving an indication that another user selection action was detected on the device, wherein the another user selection action corresponds to three consecutive taps on the device and wherein the code that performs the another action comprises code that closes the at least one file.

\* \* \* \* \*